United States Patent [19]

Murachi

[11] Patent Number: 4,987,204

[45] Date of Patent: Jan. 22, 1991

[54] COATING COMPOSITION

[75] Inventor: Tatsuya Murachi, Aichi, Japan

[73] Assignee: Toyoda Gosei Co., Ltd., Nishikasugai, Japan

[21] Appl. No.: 303,263

[22] Filed: Jan. 30, 1989

[30] Foreign Application Priority Data

Apr. 30, 1988 [JP] Japan ................................. 63-107984
Apr. 30, 1988 [JP] Japan ................................. 63-107985

[51] Int. Cl.$^5$ ..................... C08G 18/10; C09D 175/04
[52] U.S. Cl. ..................................... 528/59; 528/74.5; 524/730; 524/795
[58] Field of Search ................. 528/74.5, 59; 524/730, 524/795

[56] References Cited

U.S. PATENT DOCUMENTS 4,748,212  5/1988  Murachi et al. .................. 525/359.2
4,849,468  7/1989  Murachi et al. .................... 524/523

Primary Examiner—Maurice J. Welsh
Assistant Examiner—Rabon Sergent
Attorney, Agent, or Firm—Cushman, Darby & Cushman

[57] ABSTRACT

The present invention relates to a coating composition comprising 2–100 parts by weight of a fluororesin, 5–100 parts by weight of a silicone oil, and a solvent to 100 parts of a urethane prepolymer, said urethane prepolymer comprising a polyol, castor oil polyol, and a polyisocyanate, and said coating composition being suitable for use as a coating for rubber products such as weather strips for cars, glass weather strips, synthetic resin products, and others.

3 Claims, No Drawings

COATING COMPOSITION

BACKGROUND OF THE INVENTION

1. Field of the Invention

The present invention relates to a coating composition, that is suitable for use as a coating for rubber products, synthetic resin products, and others.

2. Description of the Related Art

Prior to the present invention, a resin coating such as nylon, epoxy, acrylic, acrylic ethylene copolymers, or a rubber coating such as butadiene rubber (BR), chloroprene rubber (CR), styrene-butadiene copolymer rubber (SBR), or others, has been commonly used as a surface coating for natural rubber (NR) and synthetic rubbers such as styrene-butadiene copolymer rubber (SBR), butadiene rubber (BR), isobutylene-isoprene copolymer rubber (IIR), chloroprene rubber (CR), acrylonitrile-butadiene copolymer rubber (NBR), isoprene rubber (IR), ethylene-propylene-diene terpolymer rubber (EPDM), ethylene-propylene copolymer rubber (EPM), and others, and for cotton, rayon, acrylonitrile-butadiene-styrene terpolymer (ABS), polystyrene (PS), and others.

However, in the resin coating and rubber coating mentioned above, there have been problems such as poor adhesion with the material to be coated, and the deterioration of the endurance to abrasion of the obtained coating film.

SUMMARY OF THE INVENTION

The object of the present invention is to provide a composition for a coating (a coating composition), that can solve the problems mentioned above, has good adhesion with the material to be coated, and in which the coating film obtained exhibits a strong endurance to abrasion.

To realize the object mentioned above, a means is applied, in which the present invention comprises 100 parts by weight of a urethane prepolymer, 2-100 parts by weight of a fluororesin, 5-100 parts by weight of a silicone oil, and a solvent, with the urethane prepolymer comprising a polyol, castor oil polyol, and a polyisocyanate.

A means can also be applied, in which the present invention comprises 100 parts by weight of a urethane prepolymer, 2-100 parts by weight of a fluororesin, 2 or more parts by weight of a silicone oil, 0.002-20 parts by weight of a halogenating agent, and a solvent, the urethane prepolymer comprising a polyol and a polyisocyanate.

Other objects of the present invention will become clear with an understanding of the embodiments, which will be described later, and stated in the appended claims. Also, other advantages not mentioned in this specification will become apparent to one skilled in the art upon application of the present invention.

DETAILED DESCRIPTION OF THE PREFERRED EMBODIMENTS

First, the coating composition of the first aspect of the present invention is described in detail. A description of the urethane prepolymer is first given.

As examples of a polyol, there are polyoxypropylene glycol, compounds in which propylene oxide is added to glycerin, compounds in which propylene oxide is added to cane sugar, compounds in which propylene oxide is added to trimethylol propane, compounds in which propylene oxide is added to pentaerystol, and others.

A suitable mixing ratio for the mixture of a polyol and castor oil polyol is a proportion by weight within the range of 95:5 to 5:95. When the proportion of the polyol is more than 95, the endurance to abrasion becomes poor, whereas when the this same proportion is less than 5, the coating film becomes hard.

The polyisocyanate mentioned above is a compound having a plurality of isocyanate groups. For example, there are the aromatic polyisocyanates such as tolylene diisocyanate (TDI), 1,5-naphthalene diisocyanate (NDI), xylilene diisocyanate (XDI), 4,4'-diphenylmethane diisocyanate (MDI), 4,4',4"-triphenylmethane diisocyanate (TPMI), isophorone diisocyanate (IPDI), and others, the alicyclic polyisocyanates such as 4,4'-methylenebis (cyclohexyl isocyanate) (HMDI), hexahydroxylilene diisocyanate, and others, and the aliphatic polyisocyanates such as 1,6-hexamethylene diisocyanate, and others.

The synthesis of a urethane prepolymer is performed by appropriately selecting the polyol, castor oil polyol, the polyisocyanate, and a solvent, to be described later, and making them undergo reaction for 60-360 minutes in dry nitrogen gas at a temperature of 50°-130° C.

An example of the fluororesin mentioned above is ethylene tetrafluoride, and others.

The mixing proportion of the fluororesin is 2-100 parts by weight to 100 parts by weight of the urethane prepolymer. When the mixing proportion of the fluororesin is less than 2 parts by weight, the endurance to abrasion becomes poor, whereas when the same mixing proportion is more than 100 parts by weight, the application of the coating becomes difficult.

Among the substances that can be used as a substitute for a part of the fluororesin are molybdenum disulfide, glass fiber, carbon fiber, polyethylene, silicon oxide, calcium carbonate, magnesium carbonate, clay, and others.

As examples of the silicone oil mentioned above, there are dimethyl silicone oil, methyl chloride silicone oil, methyl hydrogen silicone oil, methyl phenyl silicone oil, fluorosilicone oil, and others.

The mixing proportion of this silicone oil is 5-100 parts by weight to 100 parts by weight of the urethane prepolymer. When the mixing proportion of the silicone oil is less than 5 parts by weight, there is no substantial improvement in the endurance to abrasion, whereas when the same mixing proportion is more than 100 parts by weight, aside from the fact that no substantial increase in the endurance to abrasion can be seen, there is a decrease in the adhesiveness with the material to be coated.

The coating composition of the present invention can be mixed with a solvent, for example, an aliphatic hydrocarbon such as n-hexane, n-heptane, and n-octane, an alicyclic hydrocarbon such as cyclohexane and cyclooctane, an aromatic hydrocarbon such as benzene, ethyl benzene, toluene, and xylene, a ketone such as acetone, methyl ethyl ketone, ethyl propyl ketone, and methyl butyl ketone, an ether such tetrahydrofuran, an acetic ester such as methyl acetate, ethyl acetate, and isopropyl acetate, a halogenated hydrocarbon such as methylene chloride, 1,1,1-trichloroethane, trichloroethylene, and other solvents such as dimethyl sulfoxide (DMSO), dimethyl formamide (DMF), and others.

The suitable mixing proportion of the solvent is in the range of 10–90 parts by weight to 100 parts by weight of the coating composition. When the mixing proportion of the solvent is less than 10 parts by weight, the proportion of the solid content becomes relatively high and the viscosity of the coating composition increases, thus making it difficult to apply, which, in turn, causes an impairment of the adhesive strength. On the other hand, when the same mixing proportion is more than 90 parts by weight, the proportion of the solid content becomes low, and the film of the coating thus applied becomes thin, making it not suitable as a coating.

Next, the coating composition of the second aspect of the present invention is described in detail. First, a description of the urethane prepolymer is given.

A polyol and a polyisocyanate similar to the ones used in the first aspect of the present invention are also used.

The synthesis of the urethane prepolymer is performed by appropriately selecting the polyol, polyisocyanate, and solvent, and letting them undergo reaction for 60–360 minutes in dry nitrogen gas at a temperature of 50°–130° C.

The type of fluororesin used and its mixing proportion are the same as those in the first aspect of the present invention. Likewise, a portion of the fluororesin can be substituted with molybdenum disulfide, glass fiber, or others.

A silicone oil similar to the one used in the first aspect of the present invention can also be used. However, in the present case, the mixing proportion of the silicone oil is 2 or more parts by weight to 100 parts by weight of the urethane prepolymer. When the mixing proportion of the silicone oil is less than 2 parts by weight, there is no substantial improvement in the endurance to abrasion. Also, although there is no upper limit to this mixing proportion, a mixing proportion of less than or equal to 1 million parts by weight is suitable, and a mixing proportion of less than or equal to 100,000 parts by weight is more suitable. When the same mixing proportion exceeds 1 million parts by weight, while there is no change in the improvement in the endurance to abrasion, there is an impairment of the adhesive strength.

Next, as a halogenating agent, there are the alkyl hypohalides such as t-butyl hypochloride (t-BHC), the hypohalogenous acids such as sodium hypochlorite and potassium hypochlorite, the compounds that have a —CONX-bond (X being a halogen atom) in a molecule, such as N-bromosuccinimide (NBSI), trichloroisocyanuric acid (TCIA) and dichloroisocyanuric acid (DiCIA), and other halogenating agents such as a mixed solution comprising antimony pentafluoride, sulfur fluoride and bromine. Among the halogenating agents mentioned above, an alkyl hypohalide, a hypochlorite or a compound having a —CONX-bond in a molecule is suitable.

The mixing proportion of the halogenating agent is 0.002–20 parts by weight to 100 parts by weight of the urethane prepolymer. When the mixing proportion of the halogenating agent is less than 0.002 part by weight, the degree of halogenation becomes low, resulting in a small improvement in the adhesive strength, whereas when the same mixing proportion is more than 20 parts by weight, the stability of the coating composition is impaired.

Similarly, the type of solvent used ans its mixing proportion are the same as those in the first aspect of the present invention.

EMBODIMENTS 1 TO 11 AND COMPARATIVE EXAMPLES 1 TO 10

The embodiments exemplifying the first aspect of the present invention are described and compared with comparative examples.

The method of preparing a test material used in measuring the amount of abrasion of the coating derived from each of the embodiments and comparative examples is described in the following:

(1) Test Material

The test material is an ethylene-propylene vulcanized rubber made by vulcanizing a rubber mixture comprising 100 parts by weight of EPDM, 70 parts by weight of carbon black, 35 parts by weight of mineral oil, 7 parts by weight of zinc oxide, 2 parts by weight of stearic acid, 2 parts by weight of a vulcanizing accelerator, and 1.5 parts by weight of sulfur, for 30 minutes at a temperature of 160° C.

(2) Method of Preparation

After cleaning the surface of the test material mentioned above, the coating composition is applied according to a usual method, and prepared by letting it dry at a temperature ranging from room temperature to 180° C. A suitable range for this drying temperature is 80°–150° C. When the temperature is less than 80° C., the time it takes for the coating to harden becomes long, whereas when the temperature is more than 150° C., there is the possibility that the test material or the coating composition may age due to the excessive heat.

Also, an abrasion endurance test was performed according to the procedure described below, with the endurance to abrasion being evaluated in terms of the amount of abrasion.

Testing Machine: Tapered rotary Abrasive (Kabushikigaisha Toyo Seiki Seisakusho)
Testing Conditions:
  Abrading wheel: H-22, load: 1 kg
  Rotation speed of abrasion: 60 rpm
  Size of test material: 100 mm × 100 mm
  Abrasion cycle: 1000 times

EMBODIMENT 1

A urethane prepolymer was obtained by heating a mixture comprising 100 parts by weight of PPG2000 (molecular weight about 2,000), 100 parts by weight of castor oil polyol (hydroxyl value of 80), 75 parts by weight of MDI, and 140 parts by weight of trichloroethylene, for 3 hours in a dry nitrogen gas atmosphere at a temperature of 80° C.

A coating composition was obtained by mixing 100 parts by weight of a fluororesin and 10 parts by weight of methyl silicone oil (10,000 Cst) with 100 parts of the urethane prepolymer.

A test material was made by applying this coating composition on the material to be coated, and letting it harden by heating for 20 minutes at a temperature of 80° C. The abrasion endurance test was then performed on this test material. The result of this test is shown in Table 1.

EMBODIMENT 2

A urethane prepolymer, having the same composition as that of the urethane prepolymer in Embodiment 1, was obtained, except that the mixing proportion the MDI was 100 parts by weight. A coating composition, having the same composition as that of Embodiment 1, was likewise obtained.

A test material was made in the same manner as in Embodiment 1, and the abrasion endurance test was performed on this test material. The result of this test is shown in Table 1.

EMBODIMENT 3

A urethane prepolymer, having the same composition as that of the urethane prepolymer in Embodiment 1, was obtained, except that the mixing proportion of the MDI was 125 parts by weight. A coating composition, having the same composition as that of Embodiment 1, was likewise obtained.

A test material was made in the same manner as in Embodiment 1, and the abrasion endurance test was performed on this test material. The result of this test is shown in Table 1.

EMBODIMENT 4

A coating composition was obtained by mixing 10 parts by weight of a fluororesin and 15 parts by weight of dimethyl silicone oil (60,000 Cst) with 100 parts by weight of the urethane prepolymer in Embodiment 1.

A test material was made in the same manner as in Embodiment 1, and the abrasion endurance test was performed on this test material. The result of this test is shown in Table 1.

EMBODIMENT 5

A coating composition was obtained by mixing 10 parts by weight of a fluororesin and 20 parts by weight of dimethyl silicone oil (10,000 Cst) with 100 parts by weight of the urethane prepolymer in Embodiment 1.

A test material was made in the same manner as in Embodiment 1, and the abrasion endurance test was performed on this test material. The result of this test in shown in Table 1.

EMBODIMENT 6

A urethane prepolymer, having the same composition as that of the urethane prepolymer in Embodiment 1, was obtained, except that the mixing proportion of the PPG2000 was 50 parts by weight and that of the castor oil polyol (hydroxyl value of 80) was 150 parts by weight. A coating composition, having the same composition as that of Embodiment 1, was likewise obtained.

A test material was made in the same manner as in Embodiment 1, and the abrasion endurance test was performed on this test material. The result of this test in shown in Table 1.

EMBODIMENT 7

A urethane prepolymer, having the same composition as that of the urethane prepolymer in Embodiment 1, was obtained, except that the mixing proportion of the PPG2000 was 150 parts by weight and that of the castor oil polyol (hydroxyl value of 80) was 50 parts by weight. A coating composition, having the same composition as that of Embodiment 1, was likewise obtained.

A test material was made in the same manner as in Embodiment 1, and the abrasion endurance test was performed on this test material. The result of this test is shown in Table 1.

EMBODIMENT 8

A urethane prepolymer, having the same composition as that of the urethane prepolymer in Embodiment 1, was obtained, except that the mixing proportion of the castor oil polyol (hydroxyl value of 86) was 80 parts by weight. A coating composition, having the same composition as that of Embodiment 1, was likewise obtained.

A test material was made in the same manner as in Embodiment 1, and the abrasion endurance test was performed on this test material. The result of this test is shown in Table 1.

EMBODIMENT 9

A urethane prepolymer, having the same composition as that of the urethane prepolymer in Embodiment 1, was obtained, except that the mixing proportion of the castor oil polyol (hydroxyl value of 92) was 70 parts by weight. A coating composition, having the same composition as that of Embodiment 1, was likewise obtained.

A test material was made in the same manner as in Embodiment 1, and the abrasion endurance test was performed on this test material. The result of this test is shown in Table 1.

EMBODIMENT 10

A mixture of 150 parts by weight of a propylene oxide addition substance (molecular weight about 3,000) of glycerin, 150 parts by weight of castor oil polyol (hydroxyl value of 80), 104 parts by weight of TDI, and 200 parts by weight of trichloroethylene was prepared. Then, a urethane prepolymer was obtained by heating this mixture for 3 hours in a dry nitrogen gas atmosphere at a temperature of 80° C. A coating composition, having the same composition as that of Embodiment 1, was likewise obtained.

A test material was made in the same manner as in Embodiment 1, and the abrasion endurance test was performed on this test material. The result of this test in shown in Table 1.

EMBODIMENT 11

A mixture of 250 parts by weight of a propylene oxide addition substance (molecular weight about 3,000) of trimethylol propane, 50 parts by weight of castor oil polyol (hydroxyl value of 86), 150 parts by weight of MDI, and 225 parts by weight of trichloroethylene was prepared. Then, a urethane prepolymer was obtained by heating this mixture for 3 hours in a dry nitrogen gas atmosphere at a temperature of 80° C. A coating composition, having the same composition as that of Embodiment 1, was likewise obtained.

A test material was made in the same manner as in Embodiment 1, and the abrasion endurance test was performed on this test material. The result of this test is shown in Table 1.

COMPARATIVE EXAMPLE 1

A coating was prepared by mixing 100 parts of a liquid polybutadiene (a product of Idemitsu Sekiyu Kagaku Kogyo Kabushiki-gaisha with the brand name Idemitsu Seal AB-700W) and 10 parts of MDI. A test material was made by applying this coating on the material to be coated, and letting it harden at room temperature. The abrasion endurance test was performed on this test material. The result of this test is shown in Table 2.

COMPARATIVE EXAMPLE 2

A coating was prepared by mixing 100 parts of a liquid polybutadiene (a product of Idemitsu Sekiyu Kagaku Kogyo Kabushiki-gaisha with the brand name Idemitsu Seal AB-100) and 10 parts of MDI. A test material was made by applying this coating on the material to be coated, and letting it harden at room temperature. The abrasion endurance test was performed on this test material. The result of this test is shown in Table 2.

COMPARATIVE EXAMPLE 3

A test material was made by applying a 70% liquid solution of N-metoxymethylized nylon (a product of Teikoku Kagaku Sangyo Kabushiki-gaisha with the brand name Trejin M-20) on the material to be coated, and letting it harden at room temperature. The abrasion endurance test was performed on this test material. The result of this test is shown in Table 2.

COMPARATIVE EXAMPLE 4

A coating was prepared by mixing 100 parts of an epoxy resin (a product of Nippon Ciba Geigy Kabushiki-gaisha with the brand name Alardite PZ820) and 100 parts of a polyaminoamide (a product of Nippon Ciba Geigy Kabushiki-gaisha with the brand name Hardener HZ). A test material was made by applying this coating on the material to be coated, and letting it harden at room temperature. The abrasion endurance test was performed on this test material. The result of this test is shown in Table 2.

COMPARATIVE EXAMPLE 5

A coating was prepared by mixing 100 parts of an epoxy resin (a product of Nippon Ciba Geigy Kabushiki-gaisha with the brand name Alardite GY250) and 30 parts of a polyaminoamide (a product of Nippon Ciba Geigy Kabushiki-gaisha with the brand name Hardener HZ). A test material was made by applying this coating on the material to be coated, and letting it harden at room temperature. The abrasion endurance test was performed on this test material. The result of this test in shown in Table 2.

COMPARATIVE EXAMPLE 6

A test material was made by applying a 74% toluene solution of a chloroprene rubber (a product of Konishi Kabushiki-gaisha with the brand name Bond G2), as a coating, on the material to be coated, and letting it harden at room temperature. The abrasion endurance test was performed on this test material. The result of this test is shown in Table 2.

COMPARATIVE EXAMPLE 7

A test material was made by applying a SBR (a product of Nogawa Chemical Kabushiki-gaisha with the brand name Diabond 5010) on the material to be coated, and letting it harden at room temperature. The abrasion endurance test was performed on this material. The result of this test is shown in Table 2.

COMPARATIVE EXAMPLE 8

A test material was made by applying an acrylic resin emulsion (a product of Nogawa Chemical Kabushiki-gaisha with the brand name Diabond DA-830A) with 70% non-volatile content, as a coating, on the material to be coated, and letting it harden at room temperature. The abrasion endurance test was performed on this test material. The result of this test is shown in Table 2.

COMPARATIVE EXAMPLE 9

A test material was made by applying a denatured acrylic-ethylene emulsion (a product of Sunstar Kagaku Kabushiki-gaisha with the brand name Penguin Cement 138) with 55% non-volatile content, as a coating, on the material to be coated, and letting it harden at room temperature. The abrasion endurance test was performed on this test material. The result of this test is shown in Table 2.

COMPARATIVE EXAMPLE 10

A test material was made by applying a polyurethane coating (a product of Nogawa Chemical Kabushiki-gaisha with the brand name Diabond DA700E) on the material to be coated, and letting it harden at room temperature. The abrasion endurance test was performed on this test material. The result of this test is shown in Table 2.

As observed in Table 1 and Table 2, in the abrasion test of 1,000 cycles of the abrading wheel, the amounts of abrasion of the test materials applied with the coating of the comparative examples are equal to or more than 482 mg, which is quite high. On the other hand, the amounts of abrasion of the test materials applied with the coating compositions of the present invention are equal to or less than 5.3 mg, very small compared to the former amount. This shows the excellent property of endurance to abrasion of the coating compositions of the present invention.

That the coating compositions of the embodiments mentioned above exhibit excellent endurance to abrasion is due to the fact that the resistance to friction of the film (coat) surface was reduced as a result of the mixing of a fluororesin and a silicone oil with the coating composition, and that the hardness of the coat was improved and the friction coefficient was reduced as a result of the mixing of a fluororesin.

Also, the coating compositions of each of the embodiments mentioned above exhibited excellent adhesiveness with the vulcanized rubber used as the material to be coated. This is due to the fact that the urethane prepolymer comprising a polyol, castor oil polyol, and a polyisocyanate hardens sufficiently, thus contributing to the improvement of the adhesiveness of the coating composition.

TABLE 1

| Embodiment | Amount of Abrasion (mg/1000 cycles) |
|---|---|
| Embodiment 1 | 5.1 |
| Embodiment 2 | 4.5 |
| Embodiment 3 | 4.0 |
| Embodiment 4 | 4.5 |
| Embodiment 5 | 3.9 |
| Embodiment 6 | 5.3 |
| Embodiment 7 | 4.8 |
| Embodiment 8 | 4.7 |
| Embodiment 9 | 4.5 |
| Embodiment 10 | 5.2 |
| Embodiment 11 | 4.6 |

TABLE 2

| Comparative Example | Amount of Abrasion (mg/1000 cycles) |
|---|---|
| Comparative Example 1 | 2252 |
| Comparative Example 2 | 2290 |

TABLE 2-continued

| Comparative Example | Amount of Abrasion (mg/1000 cycles) |
| --- | --- |
| Comparative Example 3 | 631 |
| Comparative Example 4 | 692 |
| Comparative Example 5 | 572 |
| Comparative Example 6 | 691 |
| Comparative Example 7 | 1950 |
| Comparative Example 8 | 671 |
| Comparative Example 9 | 624 |
| Comparative Example 10 | 482 |

EMBODIMENTS 12 TO 23

Embodiments exemplifying the second aspect of the present invention are described below, and compared with the comparative examples.

The method of preparing a test material and the method of the abrasion endurance test, for measuring the amount of abrasion of each of the embodiments and comparative examples, are the same as those applied in Embodiments 1 to 11.

EMBODIMENT 12

A urethane prepolymer was obtained by heating a mixture of 200 parts by weight of PPG2000 (molecular weight about 2,000), 75 parts by weight of MDI, and 140 parts by weight of trichloroethylene, for 3 hours in a dry nitrogen gas atmosphere at a temperature of 80° C.

A coating composition was obtained by mixing 10 parts by weight of a fluororesin, 10 parts by weight of dimethyl silicone oil (10,000 Cst), and 0.1 part by weight of TCIA with 100 parts by weight of this urethane prepolymer.

A test material was made by applying the coating composition on a material to be coated, and letting it harden by heating for 20 minutes at a temperature 80° C. The abrasion endurance test was performed on this test material. The result of this test is shown in Table 3.

EMBODIMENT 13

A urethane prepolymer, having the same composition as that of the urethane prepolymer in Embodiment 12, was obtained, except that the mixing proportion of the MDI was 100 parts by weight. A coating composition, having the same composition as that of Embodiment 12, was likewise obtained.

A test material was made in the same manner as in Embodiment 12, and the abrasion endurance test was performed on this test material. The result of this test is shown in Table 3.

EMBODIMENT 14

A urethane prepolymer, having the same composition as that of the urethane prepolymer in Embodiment 12, was obtained, except that the mixing proportion of the MDI was 125 parts by weight. A coating composition, having the same composition as that of Embodiment 12, was likewise obtained.

A test material was made in the same manner as in Embodiment 12, and the abrasion endurance test was performed on this test material. The result of this test is shown in Table 3.

EMBODIMENT 15

A coating composition was obtained by mixing 10 parts by weight of a fluororesin, 15 parts by weight of dimethyl silicone oil (60,000 Cst), and 0.1 part by weight of TCIA with 100 parts by weight of the urethane prepolymer in Embodiment 12.

A test material was made in the same manner as in Embodiment 12, and the abrasion endurance test was performed on this test material. The result of this test is shown in Table 3.

EMBODIMENT 16

A coating composition was obtained by mixing 10 parts by weight of a fluororesin, 20 parts by weight dimethyl silicone oil (100,000 Cst), and 0.1 part by weight of TCIA with 100 parts by weight of the urethane prepolymer in Embodiment 12.

A test material was made in the same manner as in Embodiment 12, and the abrasion endurance test was performed on this test material. The result of this test is shown in Table 3.

EMBODIMENT 17

A coating composition was obtained by mixing 10 parts by weight of a fluororesin, 10 parts by weight of dimethyl silicone oil (10,000 Cst), and 0.1 part by weight of t-BHC with 100 parts by weight of the urethane prepolymer in Embodiment 12.

A test material was made in the same manner as in Embodiment 12, and the abrasion endurance test was performed on this test material. The result of this test is shown in Table 3.

EMBODIMENT 18

A coating composition was obtained by mixing 10 parts by weight of a fluororesin, 10 parts by weight of dimethyl silicone oil (10,000 Cst), and 0.1 part by weight of NBSI with 100 parts by weight of the urethane prepolymer in Embodiment 12.

A test material was made in the same manner as in Embodiment 12, and the abrasion endurance test was performed on this test material. The result of this test is shown in Table 3.

EMBODIMENT 19

A coating composition was obtained by mixing 10 parts by weight of a fluororesin, 10 parts by weight of dimethyl silicone oil (10,000 Cst), 0.002 part by weight of TCIA with 100 parts by weight of the urethane prepolymer in Embodiment 12.

A test material was made in the same manner as in Embodiment 12, and the abrasion endurance test was performed on this test material. The result of this test is shown in Table 3.

EMBODIMENT 20

A coating composition was obtained by mixing 10 parts by weight of a fluororesin, 10 parts by weight of dimethyl silicone oil (10,000 Cst), and 1 part by weight of TCIA with 100 parts by weight of the urethane prepolymer in Embodiment 12.

A test material was made in the same manner as in Embodiment 12, and the abrasion endurance test was performed on this test material. The result of this test is shown in Table 3.

EMBODIMENT 21

A coating composition was obtained by mixing 10 parts by weight of a fluororesin, 10 parts by weight of dimethyl silicone oil (10,000 Cst), and 20 parts by weight of TCIA with 100 parts by weight of the urethane prepolymer in Embodiment 12.

A test material was made in the same manner as in Embodiment 12, and the abrasion endurance test was performed on this test material. The result of this test is shown in Table 3.

EMBODIMENT 22

A urethane prepolymer was obtained by heating a mixture of 300 parts by weight of a propylene oxide addition substance (molecular weight about 3,000) of glycerin, 104 parts by weight of TDI, and 200 parts by weight of trichloroethylene, for 3 hours in a dry nitrogen gas atmosphere at a temperature of 80° C. A coating composition, having the same composition as that of Embodiment 12, was likewise obtained.

A test material was made in the same manner as in Embodiment 12, and the abrasion endurance test was performed on this test material. The result of this test is shown in Table 3.

EMBODIMENT 23

A mixture of 300 parts by weight of a propylene oxide addition substance (molecular weight about 3,000) of trimethylol propane, 150 parts by weight of MDI, and 225 parts by weight of trichloroethylene was prepared. Then, a urethane prepolymer was obtained by heating this mixture for 3 hours in a dry nitrogen gas atmosphere at a temperature of 80° C. A coating composition, having the same composition as that of Embodiment 12, was likewise obtained.

A test material was made in the same manner as in Embodiment 12, and the abrasion endurance test was performed on this test material. The result of this test is shown in Table 3.

TABLE 3

| Embodiment | Amount of Abrasion (mg/1000 cycles) |
|---|---|
| Embodiment 12 | 5.0 |
| Embodiment 13 | 4.0 |
| Embodiment 14 | 3.5 |
| Embodiment 15 | 4.1 |
| Embodiment 16 | 3.7 |
| Embodiment 17 | 5.2 |
| Embodiment 18 | 5.5 |
| Embodiment 19 | 5.1 |
| Embodiment 20 | 4.8 |
| Embodiment 21 | 5.3 |
| Embodiment 22 | 5.7 |
| Embodiment 23 | 4.4 |

As observed in Table 3 and in Table 2 shown earlier, in the abrasion test of 1,000 cycles of the abrading wheel, the amounts of abrasion of each of the test materials applied with the coating of the comparative examples are more than or equal to 482 mg, which is quite high. On the other hand, the amounts of abrasion of the test materials applied with the coating compositions of the present invention are less than or equal to 5.7 mg, a very small amount compared to that of the comparative examples. This shows the excellent property of endurance to abrasion of the coating compositions of the present invention.

That the coating compositions of the present invention exhibit such an excellent endurance to abrasion is due to the fact that the resistance to friction of the film (coat) surface was reduced as a result of the mixing of a fluororesin and a silicone oil with the coating composition, and that the hardness of the coat was improved due to the mixing of the fluororesin.

Also, the coating composition of each of the embodiments mentioned above exhibited excellent adhesiveness with the vulcanized rubber used as the material to be coated. This is mainly due to an increase in the molecular forces of the molecules of the material to be coated and the coating composition, as a result of the halogenation of the ethylene-propylene vulcanized rubber, used as the material to be coated and which that does not contain a polarized group, and the halogenation of the urethane prepolymer in the coating composition.

Since the coating compositions of the present invention exhibit excellent endurance to abrasion, as well as excellent adhesiveness, they are suitable for application as a coating for rubber products such as weather strips of cars, glass weather strips, synthetic resin products such as adhesive tapes, and others.

As many apparently and widely different embodiments of this invention may be made without departing from the spirit and scope thereof, it is to be understood that the invention is not limited to the specific embodiments thereof except as defined in the appended claims.

What is claimed is:

1. A coating composition comprising 100 parts by weight of a urethane prepolymer which is the reaction product of a polyol and a polyisocyanate, 2-100 parts by weight of a fluororesin, 2 or more parts by weight of a silicone oil, 0.002-20 parts by weight of a halogenating agent, and a solvent.

2. A coating composition, as set forth in claim 1, in which the halogenating agent is an alkyl hypohalide, a hypochlorite or a compound that has a —CONX-bond in the molecule.

3. A coating composition, as set forth in claim 1, in which the silicone oil is dimethyl silicone oil.

* * * * *